Feb. 21, 1956 H. O. HOADLEY 2,735,615

ELECTRONIC ANALOG MULTIPLIER CIRCUIT

Filed June 19, 1952

HARVEY O. HOADLEY
INVENTOR.

BY Daniel J. Mayne
Lee H. Kaiser

ATTORNEYS

United States Patent Office 2,735,615

Patented Feb. 21, 1956

2,735,615

ELECTRONIC ANALOG MULTIPLIER CIRCUIT

Harvey O. Hoadley, Rochester, N. Y., assignor to Eastman Kodak Company, Rochester, N. Y., a corporation of New Jersey Application June 19, 1952, Serial No. 294,509

2 Claims. (Cl. 235—61)

This invention relates to analog computers, and in particular to electronic circuits for performing a multiplication operation upon two quantities in the form of electrical signals.

In analog computers numbers are converted for purposes of computation into physically measurable quantities such as voltages, and computing operations are performed on these physical quantities to obtain the desired result. Most prior art apparatus for performing multiplication involved either mechanical analogs, e. g., slide multipliers and wheel-and-disk integrators, or electro-mechanical analogs, e. g., tranducers adapted to rotate a potentiometer shaft and arm through an angle proportional to a multiplicand signal. Prior art electronic anolog multipliers of which I am aware were either linear over only a limited range and incapable of performing multiplication when either the "multiplicand" or the "multiplier" signal was zero, or did not present the computed result in a form readily suitable for input to a succeeding computer for an additional arithmetical operation thereon.

It is an object of the invention to provide an electronic analog computer not involving mechanical motion which performs a multiplication operation upon two A. C. signals whose amplitudes are analogs of numerical quantities it is desired to multiply and presents their product as an A. C. signal suitable for input to a computer for a succeeding arithmetical operation. It is a further object of the invention to provide such an electronic computer which is substantially linear over a wide range and which is a "true" analog multiplier in that the output "product" signal is zero whenever either the "multiplicand" or the "multiplier" signal is zero.

The invention utilizes a well known amplifier circuit comprising a pair of electron discharge tubes with commoned anodes and a common cathode resistor. The gain of the pair, relative to a signal impressed on the control grid of one, is a function of the potential of the control grid of the other. The commoned anodes of the pair and the anode of an amplifying device are connected to opposite ends of the primary winding of an output transformer. One A. C. signal, termed a "multiplicand" signal, is fed in phase to the control grid of one tube and to the control electrode of the amplifying device. A unidirectional voltage proportional to a second signal, termed a "multiplier" signal, is impressed upon the control grid of the other tube. The amplifying device and the pair are adjusted to equal gain at zero level of the multiplier signal, thereby causing the outputs to cancel in the output transformer. At other levels of multiplier signal the gains are no longer equal and a difference signal appears in the transformer which is linearly proportional to the multiplicand signal and to the difference in gain of the pair and the amplifying device.

In the preferred embodiment of the invention the amplifying device comprises a second amplifier circuit pair identical to the first, each pair including an "amplifier" triode and a "control" triode having commoned anodes and cathodes. Equal cathode resistances are utilized for the pairs, and the commoned anodes of the pairs are connected to opposite ends of the primary winding of an output transformer. A "multiplicand" signal is applied in phase to the grids of the amplifier triodes, and means including a rectifier and a filter are provided for applying equal unidirectional voltages of opposite polarity and proportional to an A. C. multiplier signal to the grids of the control triodes. With the grids of both control triodes at the same potential, the in-phase signals at the anodes of the opposed amplifier triodes cancel in the output transformer. If differential bias is applied to the grids of the control triodes, the output signal is proportional to both the multiplicand signal and the difference in gain of the pairs, which difference is proportional to the amplitude of the multiplier signal.

For a better understanding of the present invention, together with other and further objects thereof, reference is made to the following specification and claims and to the accompanying drawing in which:

Figure 1:
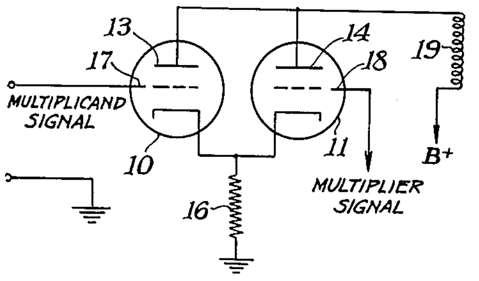
Fig. 1 is a circuit diagram of a prior art amplifier circuit.

The amplifier circuit of Fig. 1 is well known and includes an amplifier triode 10 and a control triode 11 having commoned anodes 13 and 14 respectively and a common unbypassed cathode resistor 16 to ground. The gain of the pair of triodes 10 and 11 relative to a signal impressed on the grid of one, e. g., an A. C. input or "multiplicand" signal connected between the grid 17 of the amplifier triode 10 and ground, is over a wide range essentially a linear function of the potential of the grid of the other triode, i. e., the grid 18 of the control triode 11. A source of anode potential for both the amplifier triode 10 and the control triode 11 is connected to one terminal of the primary winding of an output transformer 19.

In the circuit of Fig. 1, the voltage across the load for a constant input signal is varied by changing the plate resistance of the amplifier triode 10 and the effective impedance of the load thereon in opposite directions. The gain of the amplifier tube 10 is represented by the equation $$\text{Voltage across load} = \frac{\mu e_s Z_L}{R_P + Z_L}$$

where $\mu$=amplification factor
$e_s$=input signal
$Z_L$=impedance of load
$R_P$=plate resistance The plate current, and thus the plate resistance, of the control triode 11 is a function of the instantaneous potential of the grid 18. With the control triode 11 cut off, a quiescent operating point is determined for the amplifier triode 10. When plate current is allowed to flow through the control triode 11 due to increase of voltage of grid 18, its plate resistance decreases. The flow of control triode plate current through the common cathode resistor 16 increases the grid bias, and thus the plate resistance, of the amplifier triode 10, causing the operating point to drop. The decrease in plate resistance of the control triode 11 causes the effective load on the amplifier triode 10 to decrease. The net result is to reduce the amplification of the amplifier triode 10 as the potential of the grid 18, and thus the plate current of the control triode 11, is increased. It is thus seen that for a constant input signal applied to the grid 17, the voltage across the output transformer 19 is varied by changing the potential of the grid 18. The gain relative to a constant multiplicand signal applied to the grid 17 increases linearly to a good approximation as the potential of the grid 18 goes negative within the limits of saturation and where the grid bias approaches cutoff.

Figure 2:
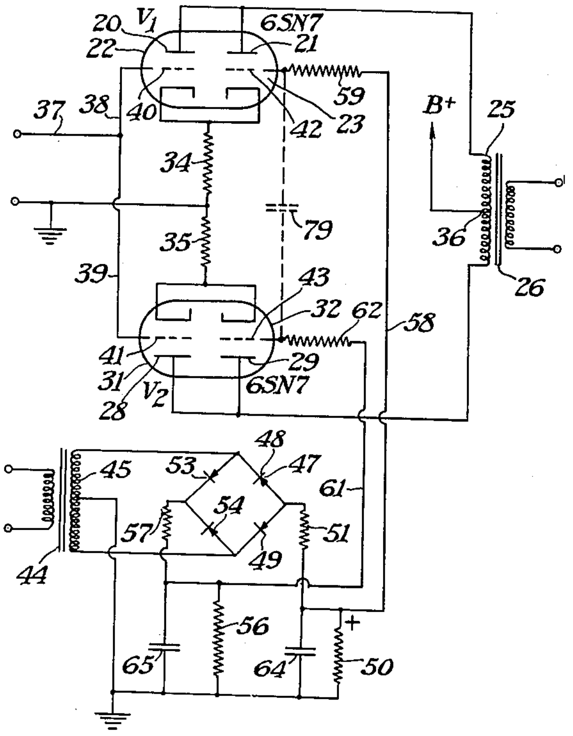
Fig. 2 is a circuit diagram of the preferred embodiment of the invention.

The preferred embodiment of the invention illustrated in Fig. 2 comprises two such triode pairs each embodied in a twin triode 6SN7 vacuum tube, although single unit tubes can be utilized. It is not necessary that the amplifier triode and the control triode of a single pair have similar characteristics, although the pairs of triodes should be similar. The anodes 20 and 21 of the amplifier triode 22 and the control triode 23 respectively of a first pair V1 are commoned and connected to one end of the primary winding 25 of an output transformer 26. The other end of the primary winding 25 is connected to the commoned anodes 28 and 29 of an amplifier triode 31 and a control triode 32 respectively of a second pair V2. The cathodes of the triodes 22 and 23 are connected to ground through a common unbypassed resistance 34; the cathodes of the triodes 31 and 32 are similarly connected to ground through a common unbypassed resistance 35 equal to the resistance 34. A source of anode potential is connected to the midpoint 36 of the primary winding 25. A "multiplicand" signal applied between the lead 37 and ground is impressed through leads 38 and 39 in phase upon the grids 40 and 41 of the amplifier triodes 22 and 31 respectively.

Means are provided for applying to the grids 42 and 43 of the control triodes 23 and 32 respectively equal potentials of opposite polarity and proportional to an A. C. "multiplier" signal impressed across the primary winding of a transformer 44. The midpoint of secondary winding 45 of the transformer 44 is grounded. A full-wave rectifier with center-tapped transformer including the serial arrangement of two metallic oxide rectifiers 48 and 49 connected across the secondary winding 45 is provided for supplying a positive unidirectional multiplier voltage proportional to the A. C. multiplier signal. When the upper end of the winding 45 is positive, current flows through the serial arrangement of bleeder resistance 50 and filter resistance 51, the rectifier 48, and the upper half of the winding 45 to ground; when the lower end of the winding 45 is positive, current also flows in the same direction through resistances 50 and 51, the rectifier 49, and the lower half of the winding 45. Current thus flows in the bleeder resistance 50 and filter resistance 51 during both halves of a cycle of A. C. signal. Similarly the serial arrangement of metallic oxide rectifiers 53 and 54 connected across the secondary winding 45 comprise a full-wave rectifier for developing a negative unidirectional multiplier potential proportional to the amplitude of the A. C. multiplier signal. Current flows in the same direction through the filter resistance 57 and bleeder resistance 56 during both halves of the A. C. multiplier signal.

A lead 58 from the junction of the resistances 50 and 51 connects a positive unidirectional multiplier potential, which is a function of the amplitude of the A. C. multiplier signal, through a resistance 59 to the grid 42 of the control triode 23; similarly, a lead 61 from the junction of the resistances 56 and 57 connects an equal unidirectional negative multiplier potential through a resistance 62 to the grid 43 of the triode 32. The filter resistance 51 in series with a filter condenser 64 and in shunt with the bleeder resistance 50 smooths the positive unidirectional multiplier voltage; similarly, the filter resistance 57 in series with a filter condenser 65 and in shunt with the bleeder resistance 56 smooths the negative unidirectional multiplier voltage.

Although a preferred embodiment of means for deriving from an A. C. multiplier signal unidirectional potentials with only a small percentage of ripple has been illustrated and described, it is to be understood that many combinations of phase inverters, filters, transformers, and rectifiers may be provided for deriving such D. C. potentials.

Figure 3:
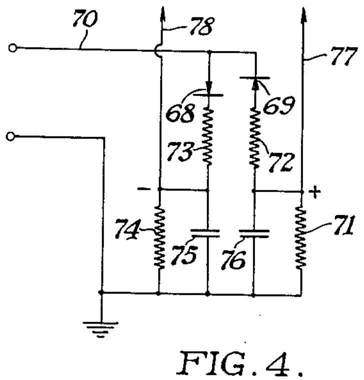
Fig. 3 is a circuit diagram of a half-wave rectifier which can be substituted for the full-wave rectifier included in Fig. 2.

Fig. 3 illustrates a half-wave rectifier which may be substituted for the full-wave rectifier circuit of the preferred embodiment of the invention to derive D. C. voltages of opposite polarity proportional to the multiplier signal. The A. C. multiplier signal is applied between lead 70 and ground. Current flows through the serial arrangement of a bleeder resistance 71, filter resistance 72, and a metallic oxide rectifier 69 when the A. C. multiplier signal is positive; similarly, current flows through the serial arrangement of a metallic oxide rectifier 68, filter resistance 73 and bleeder resistance 74 when the signal is negative. Condenser 76 smooths the positive unidirectional multiplier potential which is taken from the junction of resistors 71 and 72 and connected over lead 77 through resistance 59 to the grid 42 of control triode 23; similarly, condenser 75 smooths the negative unidirectional multiplier potential taken from the junction of resistors 73 and 74 and connected over lead 78 through resistance 62 to the grid 43 of control triode 32.

When the grids 42 and 43 of control triodes 23 and 32 are at the same potential, the gains of the two opposed amplifier triodes 22 and 31 are equal, and the multiplicand signal on the grids 40 and 41 produces equal in-phase signals in the anode output circuits of the pairs which cancel in the opposed halves of the primary winding 25 of the output transformer 26 so that no output signal is induced in the secondary. The amplified signals produced by the unidirectional voltages on the grids 42 and 43 of the control triodes 23 and 32 are blocked by the transformer and can produce no output signal in the secondary. It is thus seen that a true analog multiplier has been disclosed in that the output "product" signal is zero when either the multiplicand or the multiplier signal is zero.

If the potentials applied to the grids 42 and 43 of the control triodes 23 and 32 differ, the gains of the opposed pairs of triodes are no longer equal, and a difference signal appears in the transformer 26. This difference signal is instantaneously proportional to the multiplicand signal applied to the grids 40 and 41 and to the difference in gain of the opposed pairs of triodes. As the amplitude of the A. C. multiplier signal increases, the magnitude of the unidirectional multiplier bias voltages increase in opposite directions, and the gain of the pair V1 of triodes 22 and 23 decreases while that of the pair V2 of triodes 31 and 32 increases, both substantially linearly with the increase in the amplitude of the A. C. multiplier signal. It will thus be seen that the output signal derived from the secondary of the transformer 26 is substantially linearly proportional to the product of the multiplier and the multiplicand signals. Furthermore, the output signal is generated as an A. C. voltage of varying amplitude suitable for input to a succeeding analog computer circuit for another arithmetical operation thereon.

A high degree of filtering is desirable since any ripples in the D. C. multiplier voltages amplified by the control triodes 23 and 32 are out of phase and do not cancel in the primary winding 25. However, the time constant of each filter network, e. g., of resistances 50 and 51 and condenser 64, increases with the degree of filtering, and thus a longer time is required for the D. C. multiplier voltage to reach a steady value after a change in the ordinate of the A. C. multiplier signal. It has been found that the best compromise between the percentage of ripple and delay in unidirectional multiplier signal is obtained if a condenser 79 shown in dotted lines in Fig. 2 is connected between the grids 42 and 43 of the control triodes 23 and 32.

Figure 4:
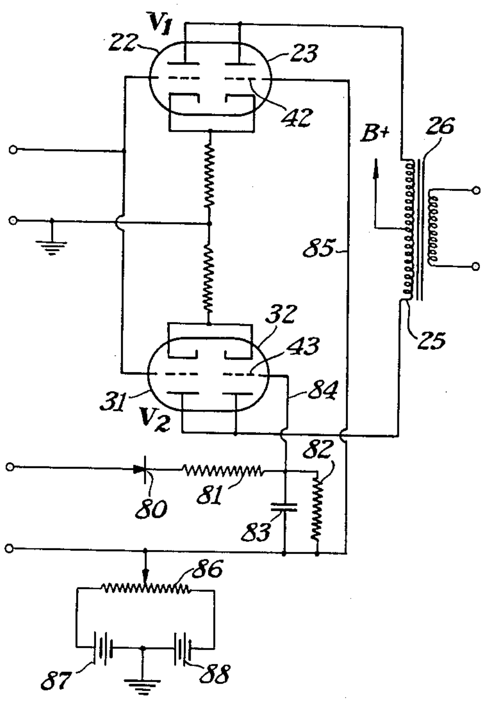
Fig. 4 is a circuit diagram of an alternative embodiment of the invention.

Fig. 4 illustrates an alternative embodiment of the invention in which a D. C. multiplier potential proportional to the A. C. multiplier signal is applied to the grid of only one control triode instead of the use of symmetrical unidirectional multiplier bias voltages as in the preferred embodiment of the invention. A fixed bias is impressed on the grid of the control triode of one pair thereby causing it to act as an amplifying device with constant gain. The output circuit as well as the multiplicand signal input circuit to the opposed triode pairs are identical with those of the preferred embodiment of the invention, and like reference numerals are used to indicate identical elements. The A. C. multiplier signal is impressed across a half-wave rectifier including the serial arrangement of a metallic oxide rectifier 80, a filter resistance 81, and the shunt arrangement of a bleeder resistance 82 and a filter condenser 83 which smooths the D. C. multiplier bias voltage applied over the lead 84 to the grid 43 of the control triode 32. The grid 42 of the control triode 23 is connected by the lead 85 to the low potential end of the filter including the bleeder resistance 82 and condenser 83 and thus is held at a fixed potential corresponding to the zero-level A. C. multiplier signal voltage. This fixed potential may be ground, but in the embodiment illustrated in Fig. 4 a potentiometer 86 in series with two batteries 87 and 88 is provided to adjust the fixed bias on the grid 42 to a value so that the multiplier voltage swings over the optimum range for the most nearly linear response. The junction of the batteries 87 and 88 is grounded and the arm of the potentiometer 86 is connected by the lead 85 to the grid 42, thus allowing the grid 42 to be maintained at a positive or negative potential with respect to ground as desired. The amplification of the pair V1 of triodes 22 and 23 is fixed and equals that of the pair V2 of triodes 31 and 32 only at the zero level of A. C. multiplier signal, thereby causing the outputs to cancel in the primary winding 25 of the output transformer 26 at this zero level. At any other value of A. C. multiplier signal, the gain of the pair V2 of triodes 31 and 32 is a function of the amplitude of the multiplier signal while that of the pair of V1 of triodes 22 and 23 is fixed, thereby producing an output signal which is linearly proportional to the product of the multiplicand and multiplier signals.

Figure 5:
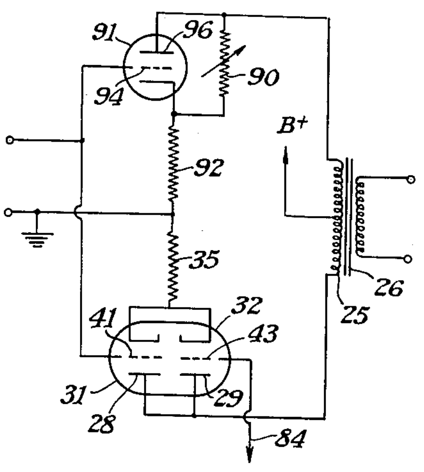
Fig. 5 is a circuit diagram of still another embodiment of the invention.

In still another embodiment of the invention illustrated in Fig. 5, an adjustable resistance 90 replaces the fixed-bias control triode 23 of the embodiment of Fig. 4. The cathode resistance 92 of a triode 91 is equal to the resistance 35 common to the cathodes of the amplifier triode 31 and the control triode 32 of the amplifier circuit. One end of the primary winding 25 is connected to the anode 96 of the triode 91 and the opposite end thereof is connected to the commoned anodes 28 and 29. The D. C. multiplier voltage proportional to and derived from the A. C. multiplier signal is connected over the lead 84 to the grid 43 of the control triode 32. The A. C. multiplicand signal is impressed in phase on the commoned grids 94 and 41 of the triode 91 and the amplifier triode 31 respectively. The variable resistance 90 shunts the triode 91 and is adjusted to such a value that the gain of the triode 91, as measured across the primary winding 25, is equal to the net gain of the pair of triodes 31 and 32 at zero level of the A. C. multiplier signal. These two outputs cancel in the primary winding 25 of the output transformer 26 at zero level of multiplier signal. The amplification of the triode 91 is fixed, while the gain of the pair of triodes 31 and 32 is a function of the amplitude of the A. C. multiplier signal. The output signal is thus an A. C. voltage proportional to the product of the multiplicand and multiplier signals.

Although the various embodiments have been illustrated and described as utilizing triodes, it is to be understood that the invention is not so limited and that other amplifying devices such as transistors or pentodes and other vacuum tubes are all within the scope of the invention.

Although only embodiments of the invention have been described which perform a multiplication operation upon two A. C. signals whose amplitudes are analogs of numerical quantities, it is apparent that either signal may be unidirectional, e. g., the output of a photoelectric cell. Of course, the rectifying and filtering means of the various embodiments are not required if the multiplier signal is in the form of a D. C. potential, and in this event the output signal is instantaneously proportional to the product of the instantaneous amplitudes of the two analog signals.

While several embodiments of the invention have been shown and described in detail, it will be understood that these are illustrative only and are not to be taken as a definition of the scope of the invention, reference being had for this purpose to the appended claims.

I claim:

1. A symmetrical electronic analog computer comprising an output transformer having a primary winding, two similar pairs of triodes, each triode of each pair having an anode, a cathode and a control grid, the triodes of each pair having commoned anodes and commoned cathodes, unbypassed equal resistors connecting said cathodes of one pair and said cathodes of the other pair, said commoned anodes of each pair being connected to opposite ends of said primary winding, a source of anode potential connected to said primary winding at the midpoint thereof, input means for applying a multiplicand signal to the grid of one triode of said each pair whereby said grids are equally biased with respect to ground and input means for applying an unidirectional potential proportional to the amplitude of a multiplier signal to the grid of the other triode of said each pair, whereby a signal equal to the product of said multiplicand signal and said multiplier signal is induced in said primary winding of said output transformer.

2. A symmetrical electronic analog computer comprising an output transformer having a primary winding, two similar pairs of electron discharge tubes, each tube of each pair having an anode, a cathode and a control grid, the tubes of each pair having commoned anodes and commoned cathodes, unbypassed equal resistors connecting said cathodes of one pair and said cathodes of the other pair, said commoned anodes of each pair being connected to opposite ends of said primary winding, a source of anode potential connected to said primary winding at the midpoint thereof, input means for applying a multiplicand signal to the grid of one tube of said each pair, whereby said grids are equally biased with respect to ground, input means for applying an unidirectional potential proportional to the amplitude of a multiplier signal to the grid of the other tube of said each pair and means for adjusting the bias on the grid of one of said other tubes of said each pair so that the outputs of said pairs cancel in said primary winding at zero level of said multiplier signal and thus allowing a signal proportional to the product of said multiplicand signal and said multiplier signal to be induced in said primary winding of said output transformer.

References Cited in the file of this patent

UNITED STATES PATENTS

| | | |
|---|---|---|
| 2,217,269 | Foster | Oct. 8, 1940 |
| 2,239,776 | Brunn | Apr. 29, 1941 |
| 2,399,586 | Toomin | Apr. 30, 1946 |
| 2,484,107 | Maron | Oct. 11, 1949 |